United States Patent [19]

Lehureau

[11] Patent Number: 4,942,490
[45] Date of Patent: Jul. 17, 1990

[54] THIN LAYER MAGNETIC READ/WRITE HEAD

[75] Inventor: Jean-Claude Lehureau, Sainte Genevieve des Bois, France

[73] Assignee: Thomson-CSF, Paris, France

[21] Appl. No.: 221,455

[22] PCT Filed: Oct. 28, 1987

[86] PCT No.: PCT/FR87/00424

§ 371 Date: Aug. 18, 1988

§ 102(e) Date: Aug. 18, 1988

[87] PCT Pub. No.: WO88/03307

PCT Pub. Date: May 5, 1988

[30] Foreign Application Priority Data

Oct. 28, 1986 [FR] France ................................ 8614974

[51] Int. Cl.$^5$ .................................................. G11B 5/12
[52] U.S. Cl. ...................................... 360/126; 360/119
[58] Field of Search ............... 360/126, 125, 127, 119, 360/120

[56] References Cited

U.S. PATENT DOCUMENTS 4,399,479 8/1983 Meckel .............................. 360/126

FOREIGN PATENT DOCUMENTS 55-73913 6/1980 Japan .
57-141009 1/1982 Japan .
58-53019 3/1983 Japan .
60-150219 8/1985 Japan .
61-151818 7/1986 Japan .

*Primary Examiner*—John H. Wolff
*Attorney, Agent, or Firm*—Oblon, Spivak, McClelland, Maier & Neustadt

[57] ABSTRACT

A thin layer magnetic read/write head is formed on a substrate in such a manner that a first magnetic pole has a flank which forms a first angle with the side of the substrate and a second magnetic pole has a second flank which is substantially parallel to the first flank. The two flanks are separated by a layer of amagnetic material. In order to produce a device which can be especially applied to magnetic tape write/read structures.

4 Claims, 5 Drawing Sheets

FIG_1
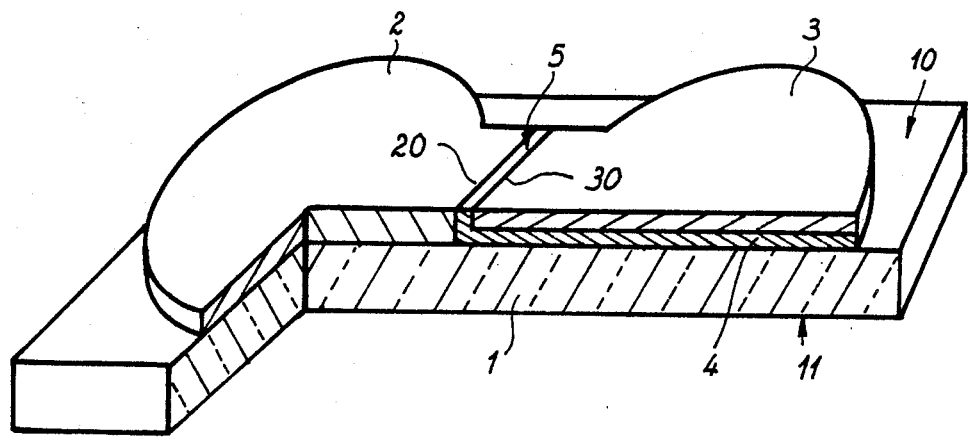
FIG_2
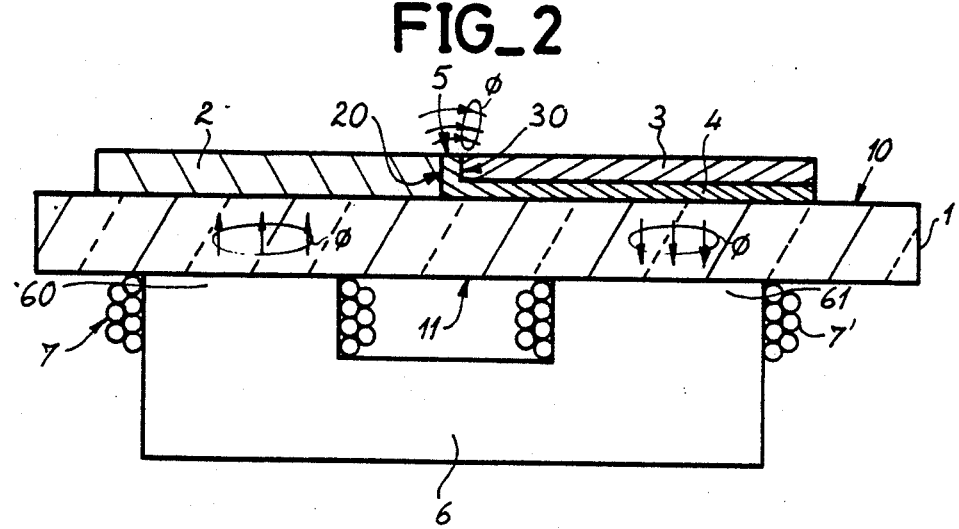

FIG_3
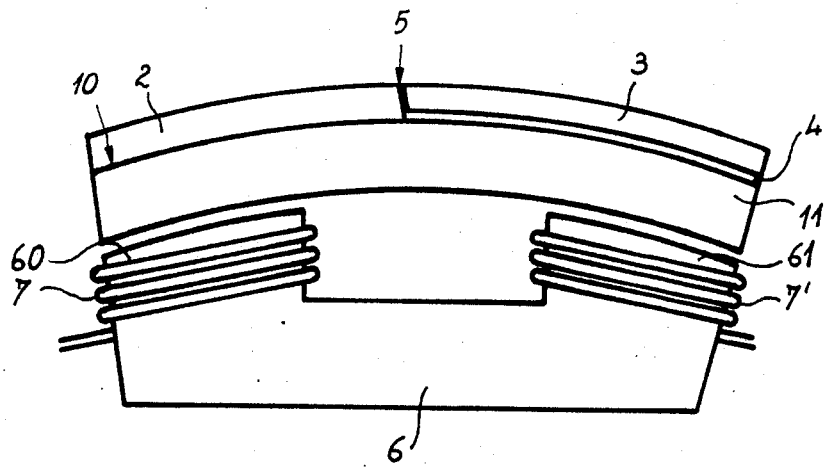
FIG_4
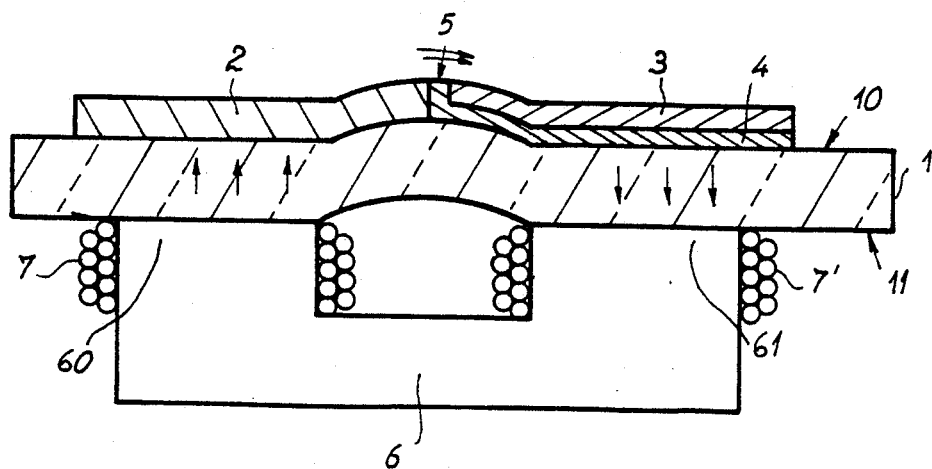

FIG_5
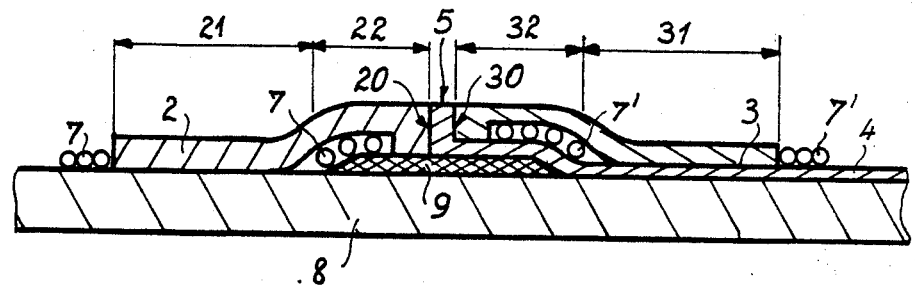
FIG_6
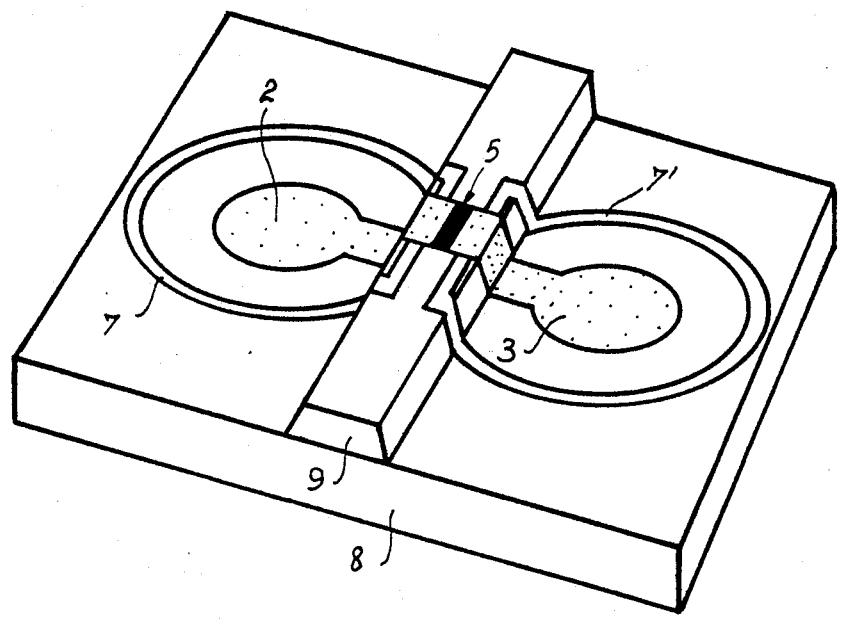

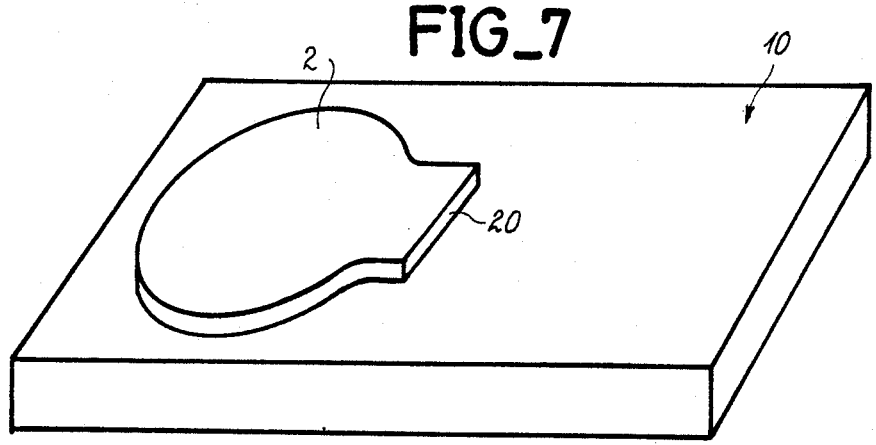
FIG_7
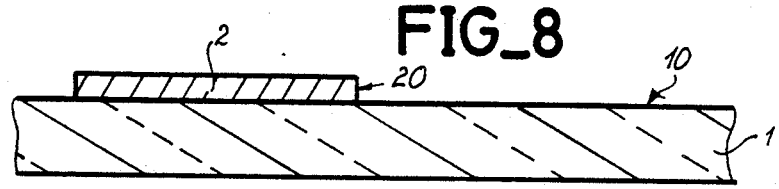
FIG_8
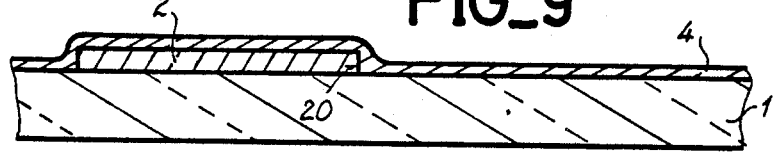
FIG_9
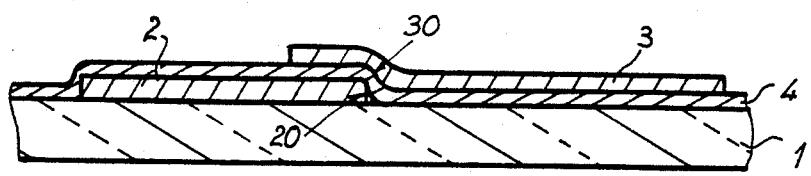
FIG_10
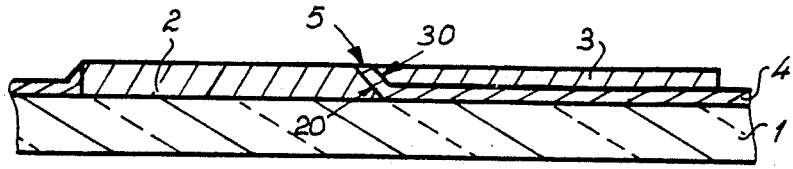
FIG_11

FIG_12
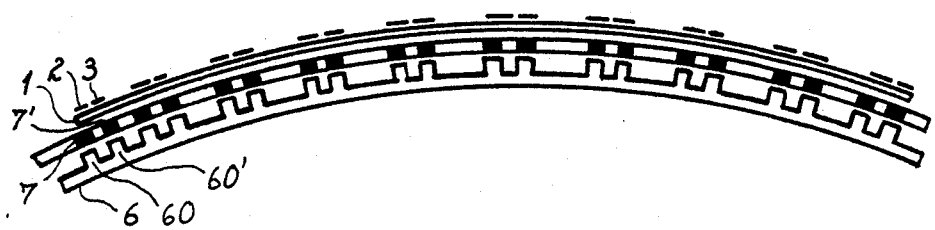

THIN LAYER MAGNETIC READ/WRITE HEAD

BACKGROUND OF THE INVENTION

FIELD OF THE INVENTION

The invention concerns a write/read head in thin layers and a method for manufacturing it which can be applied especially to magnetic heads.

DISCUSSION OF BACKGROUND

In the known technology for making magnetic heads in thin layers, the gap of the magnetic head is made by superimposing magnetic layers consituting the first magnetic pole, a non-magnetic layer consituting the gap itself and, finally, another succession of magnetic layers constituting the second pole.

For example, a magnetic head of this type is described in the French patent application No. 86 05238 filed on Apr. 11, 1986.

The unit is etched so as to define the height of the gap corresponding to the track width. After sawing, this gap is ground so as to adjust the depth of the gap.

The numerous types of thin layer heads differ in the nature of the substrates, superstrate and layers used as well as in the mode of manufacturing the coil. However, the mode of manufacturing the gap is always identical to the one mentioned above.

The operation for adjusting the depth of the gap is done individually and is very complex. For, this depth should not exceed about ten microns, otherwise there is the risk of excessively reducing the efficiency of the head. The sawing operation itself gives lack of precision of several tens of microns.

The known technology for thin layer magnetic heads thus comes up mainly against the difficulties entailed by a stage for the individual grinding of the heads, which is very costly and has a low success rate.

SUMMARY OF THE INVENTION

The invention therefore provides for integrating this grinding stage in the operations prior to the sawing of the substrate, thus reducing its cost by a ratio close to the level of integration of the heads on the substrate, which may reach a rate of 1000. Furthermore, according to the invention, the type of head made is more efficient than prior art heads.

The invention therefore concerns a magnetic write/read head in thin layers characterized in that it comprises:
- a piece of substrate having a main side;
- a first magnetic circuit pole located on this main side and having a first flank forming an angle with the main side;
- a second magnetic circuit pole located on the main side with a layer of non/magnetic material located between the second pole and the main side, this second pole also having a second flank which is substantially perpendicular to the main side and defines a gap of substantially constant thickness with the first flank.

The invention also concerns a method for making a magnetic head in thin layers comprising the following successive steps:
(a) a first step for the depositing and cutting out, on a side of a substrate, of a first magnetic pole having a flank that forms an angle with the side of the substrate;
(b) a second step for the depositing, on the unit facing the substrate and the first magnetic pole, of a layer of a non-magnetic material;
(c) a third step for depositing and cutting out, on the layer of non-magnetic material, of a second magnetic pole, one part of which overlaps the flank of the first pole;
(d) a fourth step for the machining and grinding of the layer of non-magnetic material and of the second magnetic pole.

BRIEF DESCRIPTION OF THE DRAWINGS

The various objects and features of the invention will appear more clearly from the following description, made with reference to appended fiqures, of which:

FIG. 1 shows a section, in perspective, of an embodiment of a magnetic head in thin layers according to the invention;

FIG. 2 shows a sectional view of the head of FIG. 1 with the magnetic field induction circuits;

FIG. 3 shows a first alternative embodiment of a magnetic head according to the invention;

FIG. 4 shows a second alternative embodiment of a magnetic head according to the invention;

FIGS. 5 and 6 show an embodiment of a magnetic head according to the invention wherein magnetic field induction coils are deposited on the same side of the substrate as the magnetic poles of the head;

FIGS. 7 to 11 show different stages in the accomplishing of the method according to the invention;

FIG. 12 shows a method for the collective making of magnetic heads according to the invention.

DESCRIPTION OF THE PREFERRED EMBODIMENTS

Referring to a FIG. 1, we shall first describe an embodiment of a magnetic head according to the invention. This head has a substrate part or supporting part 1 with a plane side 10.

This plane side 10 has a first magnetic head pole 2 which has a flank 20 forming an angle with the plane of the side 10. According to the embodiment shown in FIG. 1, the flank 20 is substantially perpendicular to the plane of the side 10. The side 10 also bears a layer 4 of a non-magnetic material which covers the flank 20 of the first pole 2. The layer 4 has a second pole 3, a flank 30 of which is substantially perpendicular to the plane of the side 10 and parallel to the flank 20.

The flanks 20 and 30 define a gap 5 between the poles 2 and 3.

The upper sides of the poles 2 and 3 and the non-magnetic layer 4 are at the same level, at least at the location of the gap 5.

A magnetic support (not shown) placed before this gap 5 is used to connect the two poles magnetically and close the magnetic circuit of the head.

FIG. 2 represents a cross-sectional view of the head of FIG. 1. The supporting part 1 is made of a non-magnetic material such as glass, and its thickness is small so that a magnetic writing or reading field goes through it without excessive loss.

On the other side of the side 10 of the supporting part 1, facing the poles 2 and 3, there are placed the ends 60 and 61, respectively, of a magnetic circuit 6. Magnetic field induction coils, 7 and 7', are placed on the magnetic circuit near the ends 60 and 61. These coils induce a magnetic field which flows through the poles 2 and 3 in the direction of the arrows 0 in FIG. 2. This fiqure shows that a magnetic support, for example a magnetic tape, which would be placed on the upper surface of the poles 2 and 3, would magnetically couple the two poles above the gap. The head shown in FIG. 23 thus constitutes a write/read magnetic head.

In FIG. 1 and 2, the upper side of the head is plane. As shown in FIG. 3, it can also have a curved convex shape. The supporting part 1, especially its side 10, is curved. The poles 2 and 3, and non-magnetic layer 4, are made on this side 10 and therefore have a curved shape. It must be noted that the ends 60 and 61 of the magnetic circuit 6 should be curved to match the shape of the part 1.

A head of this type can be used, more especially, in write/read devices using magnetic tapes where the tape can be better placed flat against the head.

As shown in FIG. 4, the curve of the head can be limited to a region surrounding the gap 5. In this case, the supporting part 1 is more curved only in a small region and the magnetic circuit be designed so that its ends 60 and 61 are matched to the plane parts of the part 1, thus facilitating the making of the circuit 6.

Referring to FIG. 5 and 6 we shall describe an embodiment of a magnetic head in which the coil is flat. This head comprises a substrate wafer 8 made of a magnetic material unlike in the embodiments described earlier. On this substrate wafer 8, there is placed a part 9, made of a magnetic material, with a curved convex section so that head can be given a bulging shape. A first coil 7 is made on the substrate 8 and the part 9. This coil 7 may have a helical shape, for example, and one part of the coil overlaps the part 9. It is made, for example, by silk-screen process.

A first magnetic pole 2 is in contact, through a part 21 with the substrate 8, with the center of the helical coil. Futhermore, through a part 22, it overlaps the coil 7 and the part 9. It has a flank 20 located sudstantially in the middle of the part 9.

A layer of non-magnetic material 4 covers the part 9, the substrate 1 and the flank 20 of the pole 2.

A second helical coil 7', similar to the first coil 7, lies on the layer of the non-magnetic material 4 with a portion overlapping the part 9.

Finally, a second magnetic pole 3 is in contact, through a part 31, with the layer 4 at the center of the coil 7'.

Furthermore, through a part 32, it overlaps the coil 7' and the part 9 in such a way that it has a flank 30 in contact with the insultant located on the flank 20 of the pole 2. The flanks 20 and 30 thus define the gap of the magnetic head.

Referring to FIG. 7 to 11, we shall now describe an example of a method, according to the invention, for making a magnetic head such as that of FIG. 1.

In a first step, a layer of a magnetic material is deposited on a side 10 of a substrate 1, and then, in this layer, a magnetic pole 2 is cut out, having at least one flank 20 which is substantially perpendicular to the side 10 of the substrate 1.

Thus, a component such as the one shown in FIGS. 7 and 8 is obtained.

During a second step, shown in FIG. 9, a layer of a non-magnetic material 4 is deposited.

During a third step, shown in FIG. 10, a layer of magnetic material is deposited, and then a magnetic pole 3 is cut out in this layer, with a flank 30 facing the flank 20 of the pole 2.

In a fourth step, a machining operation is done followed by a grinding operation, the effect of which is to remove the insulant layer located on the magnetic pole 2 and to make the two poles 2 and 3 flush with the two flanks 20 and 30 which define the gap of the magnetic head as shown on FIG. 1.

The method of the invention enables the making of several heads, thus described, on one and the same substrate. In this case, at the end of the fourth step, there is provision for a fifth step for cutting out the heads thus made collectively.

According to the method of the invention it is also possible to make several heads collectively with their magnetic circuit as described with reference to FIG. 2. This method of the invention is illustrated in FIG. 12.

This fiqure shows a set of magnetic heads 2 and 3 lying on a substrate wafer 1.

After this set of heads has been made, as described earlier, in the first four steps of the method, pairs of coils, such as 7—7', are made molded in a non-magnetic material. These coils 7—7' are made with the same pitch as the magnetic poles 2-3 so that they can be made put in correspondence with one another.

Then, the magnetic circuits 6 are made of a material such as ferrite. These magnetic circuits have pairs of blocks 60, 60' with the same pitch as the magnetic coils so that a pair of blocks can be associated with each pair of coils.

The substrate wafer 1, carrying the magnetic poles 2, 3, is then associated, as shown in FIG. 12, with the set of coils and the ferrite magnetic circuits 6 in such a way that, with each pair of poles 2, 3, there is associated a pair of coils 7, 7' and a pair of ferrite blocks 60, 60'. Finally, the fifth step mentioned earlier provides for separating each magnetic head individually by cutting out along the dots and dashes shown to the right of FIG. 12.

According to an alternative to the method of the invention, used to make a head such as the one described with reference to FIG. 5 and 6, before the first step described above, there is provision for a stage for making a mesa 9 of non-magnetic material on the substrate 1. These mesas cover a zone which will include, after manufacturing, the gap 5 of the head.

Then, there is provision for a stage for making a first coil 7, by silk screen process for example.

This coil has a central part 21 without any winding, and overlaps a part of the mesa 9.

The first step described earlier can thus be used to make a first pole 2, a part 21 of which is at the center of the coil 7 and substantially reaches the middle of the mesa 9.

The second step for depositing a layer insulant is accomplished as described above.

Then, between this second step and the third step, there is a provision for a stage for making a second coil 7'. This coil also has a central part 31 wihtout any winding and overlaps a part of the mesa 9.

The third step for making a second magnetic pole 3, as described above, is undertaken. This pole 3 is made in such a way that a part 31 is at the center of the coil 7', and another part 32 covers the coil 7' and faces the first pole 2.

The fourth machining and grinding step is then made as described above.

It is quite clear that the above description has been made only by way of example and that other alternatives can be envisaged without going beyond the scope of the invention.

I claim:

1. A thin layer magnetic write/read head, comprising:
   a substrate having a main side;
   a first magnetic circuit pole located on said main side and having a first flank portion forming a first angle with said main side;
   a second magnetic circuit pole located on said main side with a layer of non-magnetic material located between said second pole and said main side wherein said second pole further comprises a second flank portion which second flank portion forms a second angle with said main side whereby said second angle is supplementary to said first angle to thereby define a gap of substantially constant thickness between said first and second flank portions, said gap containing non-magnetic material.

2. A magnetic head according to claim 1, wherein a side of said substrate is convex shaped at the position of said gap.

3. A magnetic head according to claim 1, wherein said substrate is made of a non-magnetic material and wherein two ends of a magnetic field induction circuit are provided with at least one magnetic field induction coil on a second of said substrate wherein said second side is opposite to said main side and wherein each of said ends of said magnetic field inductions circuit are facing one of said first and second magnetic circuit poles.

4. A magnetic head according to claim 1, further comprising a non-magnetic material portion located beneath respective portions of each of said poles and wherein said non-magnetic material portions are adjacent said flank portions of said poles and wherein said magnetic head further comprises at least one magnetic induction coil positioned on said substrate and on said non-magnetic material portion wherein said magnetic induction coil surrounds at least respective second portions of each of said poles wherein said second poles are not located on said non-magnetic material portion and wherein the said substrate is made of magnetic material.

* * * * *